Patented Jan. 15, 1929.

UNITED STATES PATENT OFFICE.

ALFRED E. JURY, OF RUTHERFORD, NEW JERSEY, ASSIGNOR TO MORGAN & WRIGHT, OF DETROIT, MICHIGAN, A CORPORATION OF MICHIGAN.

TIRE CASING AND ITS METHOD OF MANUFACTURE.

No Drawing.   Application filed January 15, 1927.   Serial No. 161,466.

In the manufacture of casings for pneumatic tires, particularly the low pressure or so-called balloon casings, one objection has been a premature separation of the vulcanized rubber composition from the strain-resisting elements which today are very largely plies of parallel cords in crossed relation although some woven fabric tires are still being manufactured and sold.

It has been discovered that the flexing qualities of casings may be improved and separation of the covering rubber composition retarded, and thereby the serviceability of the tire casing increased, by removing from the strain-resisting elements—cords or woven fabric—the filamentary or hair-like projections of fiber which have heretofore been present in the rubberized fabric—cord or woven, which has been incorporated in the casings.

According to the invention and considering the manufacture of a cord type balloon casing by way of example, the constituent cords, either singly or, and preferably, in the form of a parallel layer of many cords, are subjected to heat treatment—such as by passing through a flame in a form of apparatus like that used in the singeing of yarns in the textile industry with an automatic means for cutting off the flame when the passage of the cords is interrupted—or by passage of the cords through heated metallic surfaces, flat or grooved.

The singeing operation may be carried on at the textile mills or in one operation with the rubberization of the cords or plies of cords; for instance, in advance of a spreading, friction and/or skim coating calendering or in advance of a solutioning machine, or in advance of any other rubberizing operation that the manufacturer may desire to use. In other words, the singeing operation for removing the projecting fibrous filaments from the cords may be performed separately or simultaneously with the application of the rubber.

While it is believed that the singeing operation will be sufficient when applied to the finally twisted cord, if desired of course it may be applied to the constituent yarns before their twisting together to form the complete cord, but in this case of course it would not be possible in the factories of rubber manufacturers as they are at present equipped to carry on the rubberizing operation simultaneously with the singeing operation.

The rubber may be applied to the singed cords either in the form of latex with or without compounding ingredients, in the form of mixed vulcanizable rubber composition (as most largely employed today), in the form of solutions made by cutting the rubber with a solvent, or in any other desired manner, inasmuch as the invention is obviously not confined to any particular manner of rubberization and is intended to comprehend any and all ways of assembling the rubber with the fabric.

After the plies on the cord fabric have been rubberized they are cut up and built into tire casings in any manner desired, the practice of the manufacturers differing somewhat in detail but generally being much the same. And after the tire casing has been built it is vulcanized in any usual well-known manner.

In the foregoing reference has been particularly made to the application of the invention to cords or cord fabric but it is to be understood that the invention is intended to be applied to any strain-resisting material for incorporation into tires, whether woven or unwoven, and either to a single cord or a group of cords in a parallel or woven formation. The invention is intended particularly for the plies of fabric constituting the carcass of tire casings, especially balloon tire casings, but some of the advantages of the invention may be realized in a measure in all the constituent textile elements of a casing, such as breaker fabrics, flipper-strips, chafing strips and the like.

It has been found that specimens of the invention have a substantially increased resistance to separation when subjected to flexing tests and thereby possess marked advantage for pneumatic tire casings, and especially of the balloon type, in the walls of which there is a great deal more of flexing and bending than in the high pressure type of casing, although the invention is applicable to the latter with advantage.

While the invention may be susceptible of various explanations, it is believed that the removal of the fibrous or filamentary projections from the constituent cords or yarns composing the cords—whether in cord fabric or in woven fabric—eliminates a source or origin of "separation". It is believed that in tire fabrics as heretofore rubberized the fibrous filaments are imbedded in a projecting or protruding position and in service, under strain, being of different elasticity from the rubber, are fractured and thus initiate the formation of a blister and separation. Possibly also globules of air are caught or trapped in or under the fibrous filaments and constitute microscopic cells from which separation is also likely to start.

Having thus described my invention, what I claim and desire to protect by Letters Patent is:—

1. A pneumatic tire casing having textile strain-resisting elements substantially free of projecting fibrous filaments.

2. A pneumatic tire casing of vulcanized rubber composition having incorporated strain-resisting fibrous cords freed of projecting fibrous filaments.

3. A pneumatic tire casing of vulcanized rubber composition having incorporated strain-resisting cords singed free of projecting fibrous filaments.

4. A process of manufacturing tire casings which consists in removing projecting fibrous filaments from the strain-resisting constituents, rubberizing the same, and building and vulcanizing the casing.

5. A method of manufacturing pneumatic tire casings which consists in singeing from tire cord elements the projecting fibrous filaments, rubberizing the same, building the singed and rubberized cord elements into a casing, and vulcanizing.

Signed at New York, county and State of New York, this 14th day of January, 1927.

ALFRED E. JURY.